US012674902B2

(12) United States Patent　　　　(10) Patent No.: US 12,674,902 B2
Okamoto et al.　　　　　　　　　　(45) Date of Patent: Jul. 7, 2026

(54) OPTICAL COMMUNICATION UNDERGROUND EQUIPMENT LOCATION MAPPING SYSTEM AND METHOD

(71) Applicant: NTT, Inc., Tokyo (JP)

(72) Inventors: Tatsuya Okamoto, Musashino (JP); Daisuke Iida, Musashino (JP); Yusuke Koshikiya, Musashino (JP); Nazuki Honda, Musashino (JP)

(73) Assignee: NTT, Inc., Tokyo (JP)

( * ) Notice: Subject to any disclaimer, the term of this patent is extended or adjusted under 35 U.S.C. 154(b) by 279 days.

(21) Appl. No.: 18/682,522

(22) PCT Filed: Aug. 16, 2021

(86) PCT No.: PCT/JP2021/029938

§ 371 (c)(1),
(2) Date: Feb. 9, 2024

(87) PCT Pub. No.: WO2023/021562

PCT Pub. Date: Feb. 23, 2023

(65) Prior Publication Data

US 2025/0123415 A1　　Apr. 17, 2025

(51) Int. Cl.
*G01V 1/01*　　　(2024.01)
*G01H 9/00*　　　(2006.01)
*G01V 1/22*　　　(2006.01)

(52) U.S. Cl.
CPC .............. *G01V 1/01* (2024.01); *G01H 9/006* (2013.01); *G01V 1/226* (2013.01)

(58) Field of Classification Search
None
See application file for complete search history.

(56) References Cited

U.S. PATENT DOCUMENTS

2022/0244097 A1　8/2022　Yoda et al.

FOREIGN PATENT DOCUMENTS

JP　　　　2019117060 A　*　7/2019
WO　WO-2019022084 A1　*　1/2019　.............　G01H 17/00
WO　　　　2021010407 A1　　　1/2021

OTHER PUBLICATIONS

D. Iida, N. Honda, and H. Oshida, "Advances in distributed vibration sensing for optical communication fiber state visualization", Optical Fiber Technol., 57, 102263, 2020.
(Continued)

*Primary Examiner* — Eric S. McCall
*Assistant Examiner* — Nigel H Plumb
(74) *Attorney, Agent, or Firm* — Harness, Dickey & Pierce, P.L.C.

(57)　　　　　ABSTRACT

The present disclosure provides an underground facility position contrast system S, which includes: a scattered light intensity distribution measurement device 1 for measuring, when an earthquake vibration is applied to an optical fiber F laid underground, a change over time in a scattered light intensity distribution in a longitudinal direction of the optical fiber F; and an underground facility position contrast device 2 for measuring a change over time in a distortion response distribution in the longitudinal direction of the optical fiber F based on the change over time in the scattered light intensity distribution in the longitudinal direction of the optical fiber F, estimating an underground facility state of the optical fiber F based on the change over time in the distortion response distribution in the longitudinal direction of the optical fiber F, and associating the underground facility position of the optical fiber F with a longitudinal distance of the optical fiber F.

6 Claims, 6 Drawing Sheets

(56)  References Cited

OTHER PUBLICATIONS

T. Okamoto et al, "Tradeoff between analysis length and sensitivity in OFDR distributed acoustic sensing", IEICE Society Conference 2020.
T. Okamoto et al, "Visualization for aerial cable installation conditions with OFDR-DAS", IEICE General Conference 2021.

* cited by examiner

Fig. 1 – Prior Art

Fig. 3 S1:REQUIRE→ACQUIRE

Fig. 5 S11:REQUIRE→ACQUIRE

OPTICAL COMMUNICATION UNDERGROUND EQUIPMENT LOCATION MAPPING SYSTEM AND METHOD

CROSS-REFERENCE TO RELATED APPLICATIONS

This application is a 371 U.S. National Phase of International Application No. PCT/JP2021/029938, filed on Aug. 16, 2021. The entire disclosure of the above application is incorporated herein by reference.

TECHNICAL FIELD

The present disclosure relates to a technique of associating an underground facility position of an optical fiber with a longitudinal distance of the optical fiber based on a change over time in a scattered light intensity distribution in the longitudinal direction of the optical fiber.

BACKGROUND ART

When the optical fiber is laid under the ground, manholes are previously arranged under the ground, and the optical fiber is connected with a cable or the like in the manholes. When an abnormality occurs in the optical fiber at a certain position, it is necessary to associate the position of the manhole with a longitudinal distance of the optical fiber in order to specify the position of the manhole to be worked (see, for example, NPL 1).

A specific example of a conventional optical communication underground facility position contrast processing is shown in FIG. 1. The optical fiber F, when being laid under the ground G, is laid in the conduit T and connected by the closure C under the manhole M. The optical communication aggregation building B includes the underground facility position contrast system S.

The underground facility position contrast system S, when an intentional impact is applied to the lid of the manhole M, measures a change over time in a scattered light intensity distribution in the longitudinal direction of the optical fiber F. Then, with using an optical time domain back scattering measuring method or the like, the change over time of a distortion response distribution in the longitudinal direction of the optical fiber F is measured based on the change over time in the scattered light intensity distribution in the longitudinal direction of the optical fiber F. Further, the presence or absence of the manhole M is estimated based on the change over time in the distortion response distribution in the longitudinal direction of the optical fiber F, and the position of the manhole M is associated with a longitudinal distance of the optical fiber F.

Here, in the vicinity of the longitudinal distance 1340 m of the optical fiber F, the change over time in the distortion response of the optical fiber F indicates the presence of the intentional impact of the period 1 s. On the other hand, in the vicinity of the longitudinal distance 1360 m of the optical fiber F, the change over time in the distortion response of the optical fiber F does not indicate the presence of the intentional impact of the period 1 s. Therefore, the underground facility position contrast system S can associate the position of the manhole M with the vicinity of the longitudinal distance 1340 m of the optical fiber F.

CITATION LIST

Non Patent Literature

NPL 1
D. Iida, N. Honda, and H. Oshida, "Advances in distributed vibration sensing for optical communication fiber state visualization," Optical Fiber Technol., 57, 102263, 2020.

SUMMARY OF INVENTION

Technical Problem

However, the underground facility position contrast system S cannot reduce a human operation rate, because it is necessary to dispatch a person to the site who should apply the intentional impact to the lid of the manhole M.

In order to solve the above problem, the present disclosure aims to reduce the human operation rate in associating the underground facility position of an optical fiber with the longitudinal distance of the optical fiber.

Solution to Problem

In order to solve the above problem, when an earthquake vibration is applied to the optical fiber laid underground, the change over time in the scattered light intensity distribution in the longitudinal direction of the optical fiber should be measured.

Specifically, the present disclosure provides an optical communication underground facility position contrast system, including: a scattered light intensity distribution measurement device for measuring, when an earthquake vibration is applied to an optical fiber laid underground, a change over time in a scattered light intensity distribution in a longitudinal direction of the optical fiber; and an underground facility position contrast device for measuring a change over time in a distortion response distribution in the longitudinal direction of the optical fiber based on the change over time in the scattered light intensity distribution in the longitudinal direction of the optical fiber, estimating an underground facility state of the optical fiber based on the change over time in the distortion response distribution in the longitudinal direction of the optical fiber, and associating the underground facility position of the optical fiber with a longitudinal distance of the optical fiber. The present disclosure also provides a method for an optical communication underground facility position contrast, including the sequential steps of: acquiring, when an earthquake vibration is applied to an optical fiber laid underground, information of a change over time in a scattered light intensity distribution in a longitudinal direction of the optical fiber; measuring a change over time in a distortion response distribution in the longitudinal direction of the optical fiber based on the change over time in the scattered light intensity distribution in the longitudinal direction of the optical fiber; and estimating an underground facility state of the optical fiber based on the change over time in the distortion response distribution in a longitudinal direction of the optical fiber, and associating the underground facility position of the optical fiber with a longitudinal distance of the optical fiber.

The present disclosure also provides an optical communication underground facility position contrast device including: a scattered light intensity distribution acquisition unit for acquiring, when an earthquake vibration is applied to an optical fiber laid underground, information of a change over time in a scattered light intensity distribution in a longitudinal direction of the optical fiber; a distortion response distribution measurement unit for measuring a change over time in a distortion response distribution in the longitudinal direction of the optical fiber based on the change over time in the scattered light intensity distribution in the longitudinal direction of the optical fiber; and an underground facility position contrast unit for estimating an underground facility state of the optical fiber based on the change over time in the distortion response distribution in the longitudinal direction of the optical fiber, and associating the underground facility position of the optical fiber with a longitudinal distance of the optical fiber.

According to these configurations, since an intentional impact applied to a lid of a manhole is not utilized, but an earthquake vibration applied to the optical fiber is utilized, a human operation rate can be reduced in associating the underground facility position of the optical fiber with the longitudinal distance of the optical fiber.

Further, in the optical communication underground facility position contrast system of the present disclosure, the underground facility position contrast device measures a change over time in a vibration frequency distribution in the longitudinal direction of the optical fiber based on the change over time in the scattered light intensity distribution in the longitudinal direction of the optical fiber, estimates an underground facility state of the optical fiber based on whether the change over time in the vibration frequency distribution in the longitudinal direction of the optical fiber is continuous or discontinuous on a longitudinal distance of the optical fiber, and associates the underground facility position of the optical fiber with the longitudinal distance of the optical fiber.

According to this configuration, the positions of the manhole section, the conduit section and the like can be associated with the longitudinal distance of the optical fiber based on whether the change over time in the vibration frequency distribution in the longitudinal direction of the optical fiber is continuous or discontinuous on the longitudinal distance of the optical fiber.

Further, in the optical communication underground facility position contrast system of the present disclosure, the underground facility position contrast device measures a change over time in a vibration frequency distribution in the longitudinal direction of the optical fiber based on the change over time in the scattered light intensity distribution in the longitudinal direction of the optical fiber, estimates an underground facility state of the optical fiber based on whether the change over time in the vibration frequency distribution in the longitudinal direction of the optical fiber coincides with or differs from the change over time in the vibration frequency of the earthquake vibration, and associates the underground facility position of the optical fiber with the longitudinal distance of the optical fiber.

According to this configuration, the positions of the manhole section, the conduit section and the like can be associated with the longitudinal distance of the optical fiber based on whether the change over time in the vibration frequency distribution in the longitudinal direction of the optical fiber coincides with or differs from the change over time in the vibration frequency of the earthquake vibration.

Further, in the optical communication underground facility position contrast system of the present disclosure, the underground facility position contrast device measures a change over time in a distortion amplitude distribution in the longitudinal direction of the optical fiber based on the change over time in the scattered light intensity distribution in the longitudinal direction of the optical fiber, estimates an underground facility state of the optical fiber based on whether the change over time in the distortion amplitude distribution in the longitudinal direction of the optical fiber is continuous or discontinuous on a longitudinal distance of the optical fiber, and associates the underground facility position of the optical fiber with the longitudinal distance of the optical fiber.

According to this configuration, the positions of the manhole section, the conduit section and the like can be associated with the longitudinal distance of the optical fiber based on whether the change over time in the distortion amplitude distribution in the longitudinal direction of the optical fiber is continuous or discontinuous on the longitudinal distance of the optical fiber.

Advantageous Effects of Invention

In this way, the present disclosure can reduce the human operation rate in associating the underground facility position of the optical fiber with the longitudinal distance of the optical fiber.

DESCRIPTION OF EMBODIMENTS

Embodiments of the present disclosure will be described with reference to the accompanying drawings. The embodiments described below are examples of the present disclosure, and the present disclosure is not limited to the following embodiments.

Figure 1:
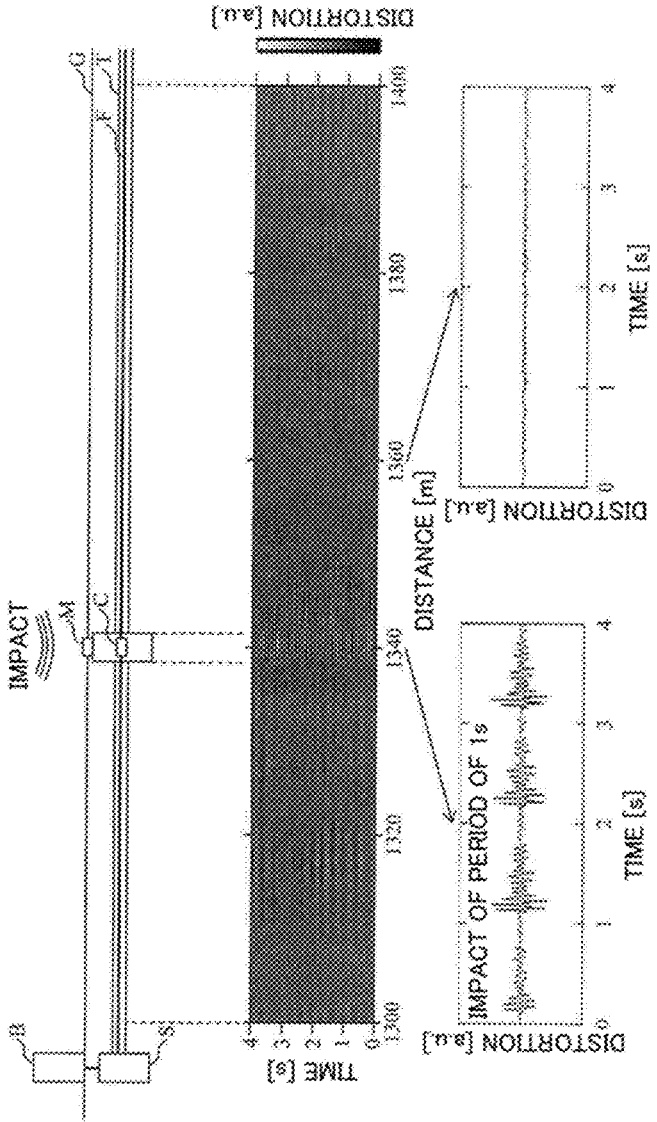
FIG. 1 is a diagram showing a specific example of an optical communication underground facility position contrast processing of a conventional art.
Figure 2:
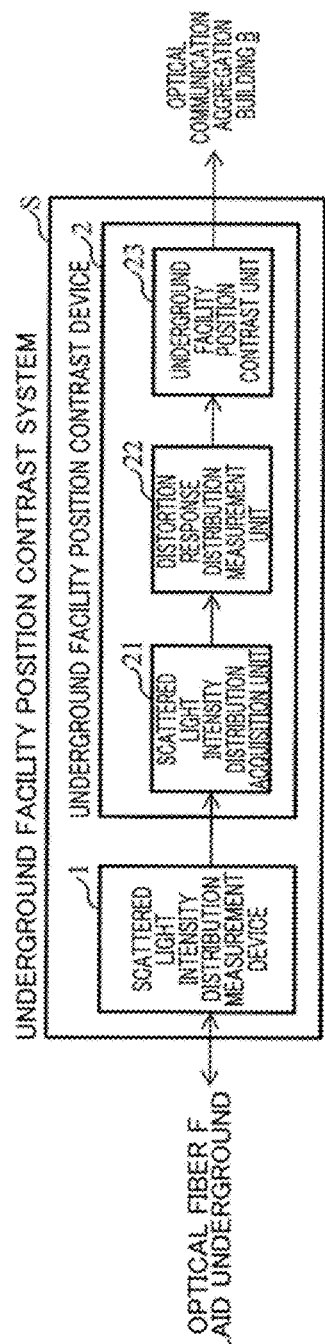
FIG. 2 is a diagram showing a configuration of an optical communication underground facility position contrast system of the present disclosure.
Figure 3:
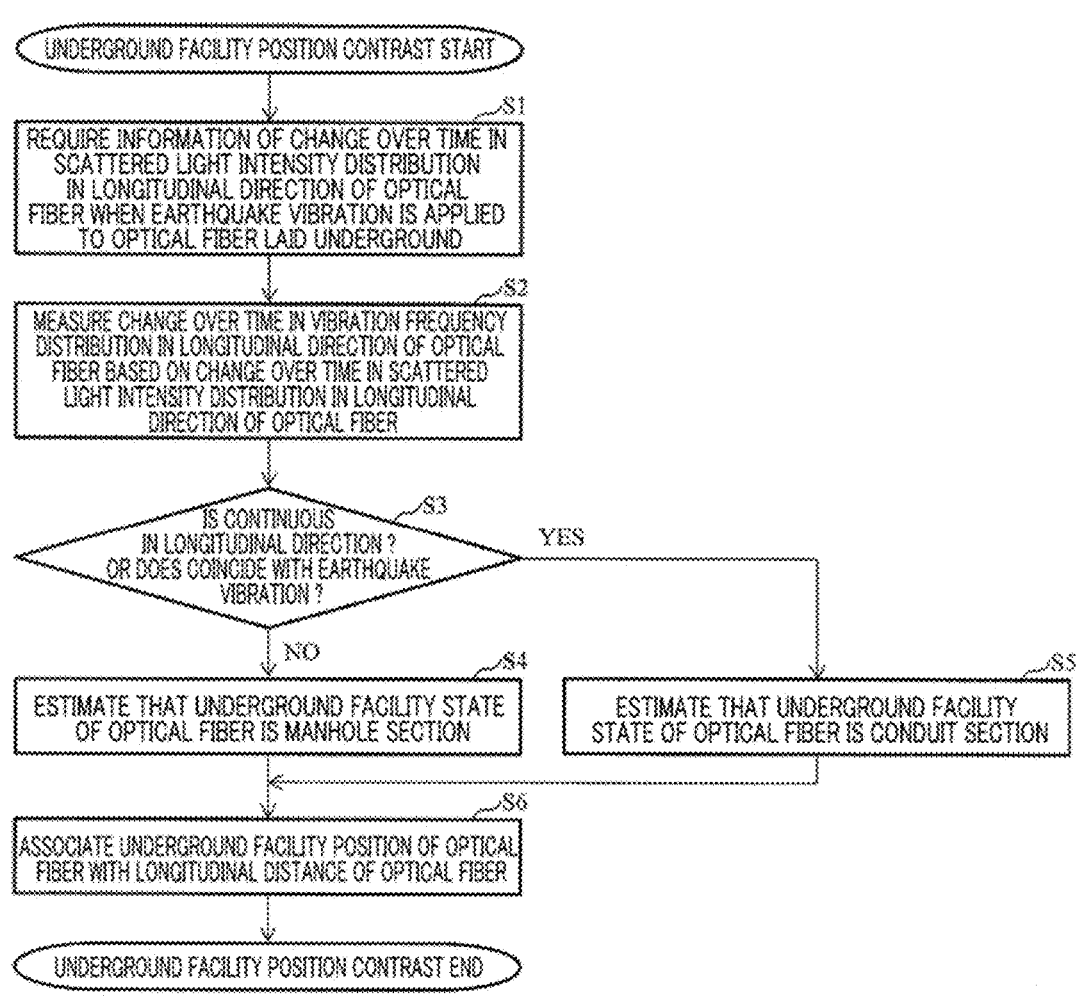
FIG. 3 is a diagram showing a procedure of an optical communication underground facility position contrast processing of a first embodiment.

Configuration of the Optical Communication Underground Facility Position Contrast System of the Present Disclosure The configuration of the optical communication underground facility position contrast system of the present disclosure is shown in FIG. 2. The underground facility position contrast system S includes the scattered light intensity distribution measurement device 1 and the underground facility position contrast device 2. The underground facility position contrast device 2 includes the scattered light intensity distribution acquisition unit 21, the distortion response distribution measurement unit 22, and the underground facility position contrast unit 23. The underground facility position contrast device 2 can be realized by installing an underground facility position contrast program (which can be recorded on a recording medium, and also provided on a network) that is shown in FIG. 3 and/or FIG. 5 into a computer.

The scattered light intensity distribution measurement device 1 measures, when an earthquake vibration is applied to the optical fiber F laid underground, a change over time in a scattered light intensity distribution in the longitudinal direction of the optical fiber F. The scattered light intensity distribution acquisition unit 21 acquires, when the earthquake vibration is applied to the optical fiber F laid underground, information of the change over time in the scattered light intensity distribution in the longitudinal direction of the optical fiber F.

The distortion response distribution measurement unit 22 measures a change over time in a distortion response distribution in the longitudinal direction of the optical fiber F based on the change over time in the scattered light intensity distribution in the longitudinal direction of the optical fiber F by using an optical time domain back scattering measuring method or the like. The underground facility position contrast unit 23 estimates an underground facility state of the optical fiber F based on the change over time in the distortion response distribution in the longitudinal direction of the optical fiber F, associates the underground facility position of the optical fiber F with a longitudinal distance of the optical fiber F, and notifies the optical communication aggregation building B.

Thus, since the intentional impact applied to the lid of the manhole M is not utilized but the earthquake vibration applied to the optical fiber F is utilized, the human operation rate can be reduced in associating the underground facility position of the optical fiber F with the longitudinal distance of the optical fiber F.

(Procedure of the Optical Communication Underground Facility Position Contrast Processing of the First Embodiment)

The procedure of the optical communication underground facility position contrast processing of the first embodiment is shown in FIG. 3. The scattered light intensity distribution acquisition unit 21 acquires, when the earthquake vibration is applied to the optical fiber F laid underground, information of the change over time in the scattered light intensity distribution in the longitudinal direction of the optical fiber F (step S1). The distortion response distribution measurement unit 22 measures the change over time in the vibration frequency distribution in the longitudinal direction of the optical fiber F based on the change over time in the scattered light intensity distribution in the longitudinal direction of the optical fiber F (step S2).

Then, the underground facility position contrast unit 23 estimates, based on whether the change over time in the vibration frequency distribution in the longitudinal direction of the optical fiber F is continuous or discontinuous on the longitudinal distance of the optical fiber F (step S3), the underground facility state of the optical fiber F (step S4, S5), and associates the underground facility position of the optical fiber F with the longitudinal distance of the optical fiber F (step S6).

Alternatively, the underground facility position contrast unit 23 estimates, based on whether the change over time in the vibration frequency distribution in the longitudinal direction of the optical fiber F coincides with or differs from the change over time in the vibration frequency of the earthquake vibration (step S3), the underground facility state of the optical fiber F (step S4, S5), and associates the underground facility position of the optical fiber F with the longitudinal distance of the optical fiber F (step S6).

Figure 4:
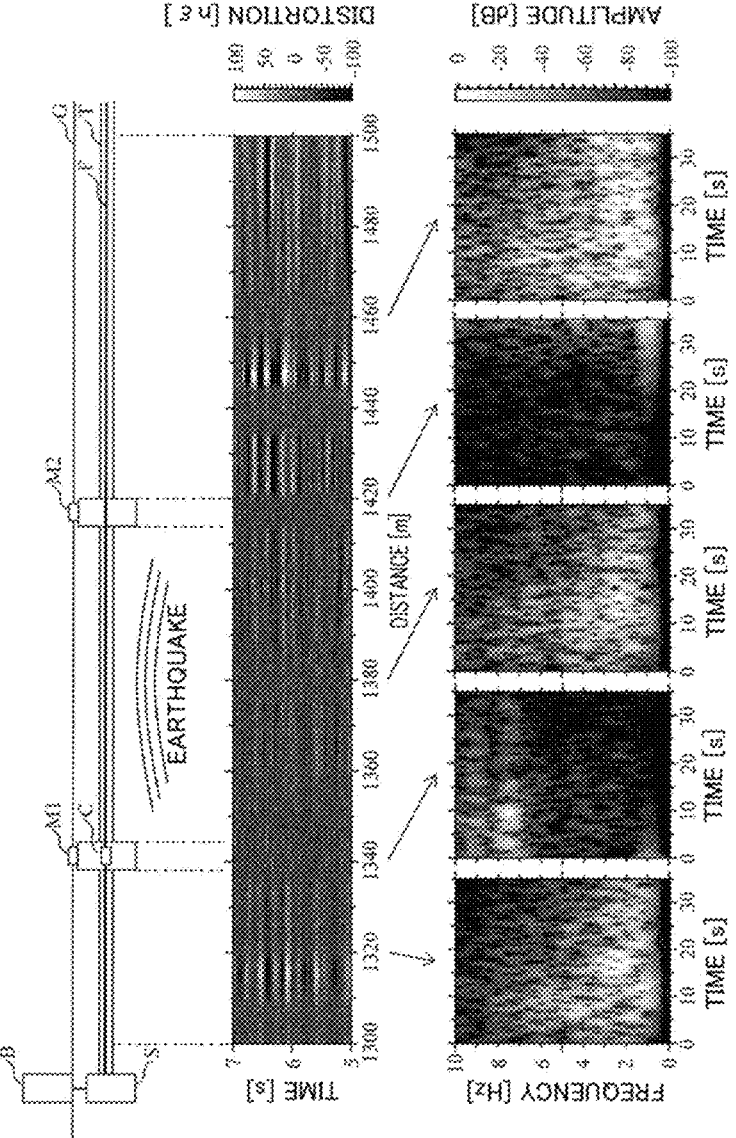
FIG. 4 is a diagram showing a specific example of an optical communication underground facility position contrast processing of a first embodiment.

The specific example of the optical communication underground facility position contrast processing of the first embodiment is shown in FIG. 4. The optical fiber F is, in being laid under the ground G, laid within the conduit T, connected by the closure C under the manhole M1, and passes under the manhole M2 without using the closure C.

In the periphery of the vicinity of the longitudinal distances 1320 m, 1380 m and 1460 m or the like of the optical fiber F, the change over time in the vibration frequency of the optical fiber F shows vibration attenuation of about 10 seconds at a high frequency of about 10 Hz and shows vibration continuation of about 30 seconds at a low frequency of about 1 Hz. That is, the change over time in the vibration frequency distribution in the longitudinal direction of the optical fiber F is continuous on the longitudinal distance of the optical fiber F (step S3, YES). Alternatively, the change over time in the vibration frequency distribution in the longitudinal direction of the optical fiber F coincides with the change over time in the vibration frequency of the earthquake vibration (step S3, YES). This is because the optical fiber F is in contact with the ground G through the conduit T.

Then, the underground facility position contrast unit 23 estimates that the underground facility state of the optical fiber F is the section of the conduit T in the periphery of the vicinity of the longitudinal distances 1320 m, 1380 m, and 1460 m or the like of the optical fiber F (step S5), and can associate the position of the conduit T with the periphery of the vicinity of the longitudinal distances 1320 m, 1380 m, and 1460 m or the like of the optical fiber F (step S6).

Only in the vicinity of the longitudinal distance 1340 m of the optical fiber F, the change over time in the vibration frequency of the optical fiber F shows about 30 seconds of vibration continuation at a high frequency of about 10 Hz and does not show the vibration itself at a low frequency of about 1 Hz. Only in the vicinity of the longitudinal distance 1420 m of the optical fiber F, the change over time in the vibration frequency of the optical fiber F does not show the vibration itself at a high frequency of about 10 Hz and shows a vibration delay of about 30 seconds at a low frequency of about 1 Hz. That is, the change over time in the vibration frequency distribution in the longitudinal direction of the optical fiber F is discontinuous on the longitudinal distance of the optical fiber F (step S3, NO). Alternatively, the change over time in the vibration frequency distribution in the longitudinal direction of the optical fiber F does not coincide with the change over time in the vibration frequency of the earthquake vibration (step S3, NO). This is because the optical fiber F is not in contact with the ground G within the manholes M1, M2.

Then, the underground facility position contrast unit 23 estimates that the underground facility state of the optical fiber F is the section of the manhole M1 in which the closure C exists only in the vicinity of the longitudinal distance 1340 m of the optical fiber F (step S4), and can associate the position of the manhole M1 in which the closure C exists with the vicinity of the longitudinal distance 1340 m of the optical fiber F (step S6). The underground facility position contrast unit 23 estimates that the underground facility state of the optical fiber F is the section of the manhole M2 through which the optical fiber F passes only in the vicinity of the longitudinal distance 1420 m of the optical fiber F (step S4), and can associate the position of the manhole M2 through which the optical fiber F passes with the vicinity of the longitudinal distance 1420 m of the optical fiber F (step S6).

In this way, the positions of the sections of the manholes M1, M2 and the section of the conduit T or the like can be associated with the longitudinal distance of the optical fiber F based on whether the change over time in the vibration frequency distribution in the longitudinal direction of the optical fiber F is continuous or discontinuous on the longitudinal distance of the optical fiber F.

On the other hand, the positions of the sections of the manholes M1, M2 and the section of the conduit T or the like can be associated with the longitudinal distance of the optical fiber F based on whether the change over time in the vibration frequency distribution in the longitudinal direction of the optical fiber F coincides with or differs from the change over time in the vibration frequency of the earthquake vibration.

(Procedure of Optical Communication Underground Facility Position Contrast Processing of the Second Embodiment)

Figure 5:
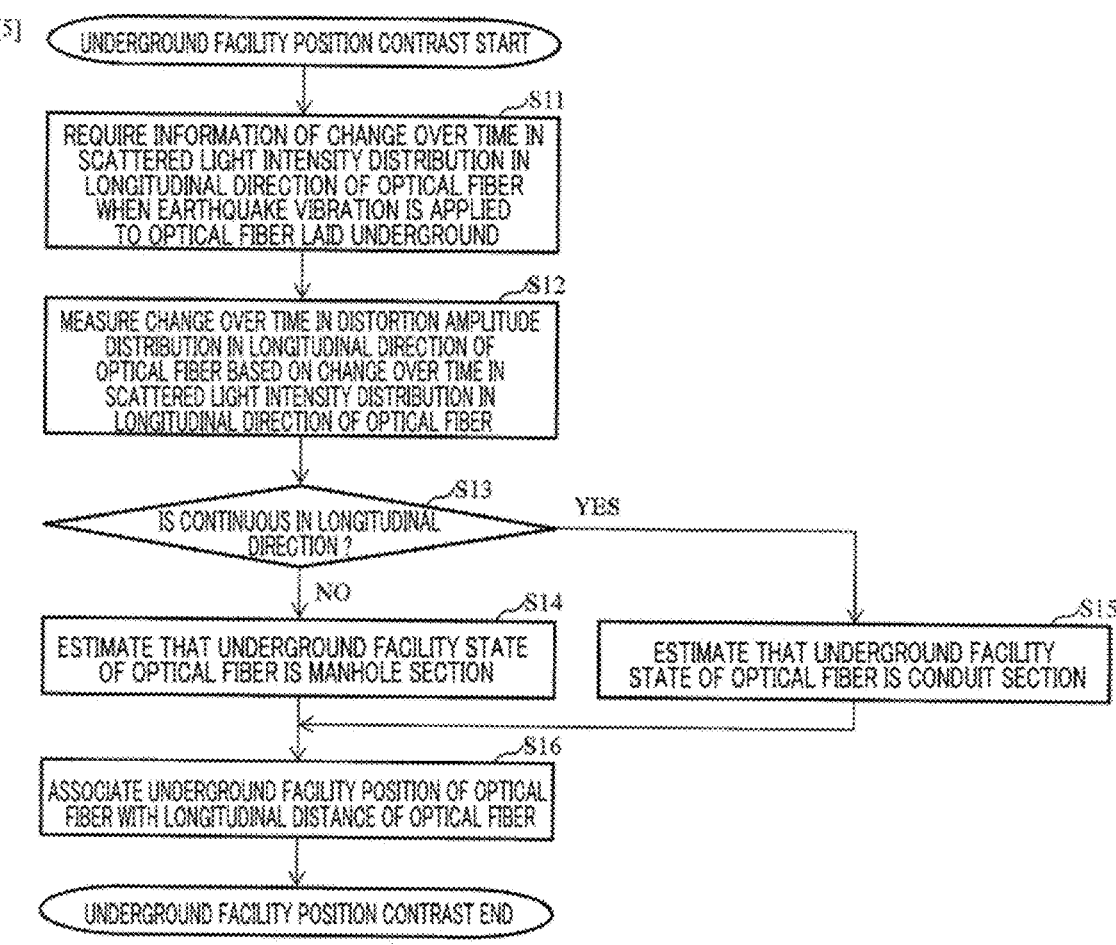
FIG. 5 is a diagram showing a procedure of an optical communication underground facility position contrast processing of a second embodiment.

The procedure of the optical communication underground facility position contrast processing of the second embodiment is shown in FIG. 5. The scattered light intensity distribution acquisition unit 21 acquires, when the earthquake vibration is applied to the optical fiber F laid underground, information of the change over time in the scattered light intensity distribution in the longitudinal direction of the optical fiber F (step S11). The distortion response distribution measurement unit 22 measures the change over time in the distortion amplitude distribution in the longitudinal direction of the optical fiber F based on the change over time in the scattered light intensity distribution in the longitudinal direction of the optical fiber F (step S12).

Then, the underground facility position contrast unit 23 estimates, based on whether the change over time in the distortion amplitude distribution in the longitudinal direction of the optical fiber F is continuous or discontinuous on the longitudinal distance of the optical fiber F (step S13), the underground facility state of the optical fiber F (step S14, S15), and associates the underground facility position of the optical fiber F with the longitudinal distance of the optical fiber F (step S16).

Figure 6:
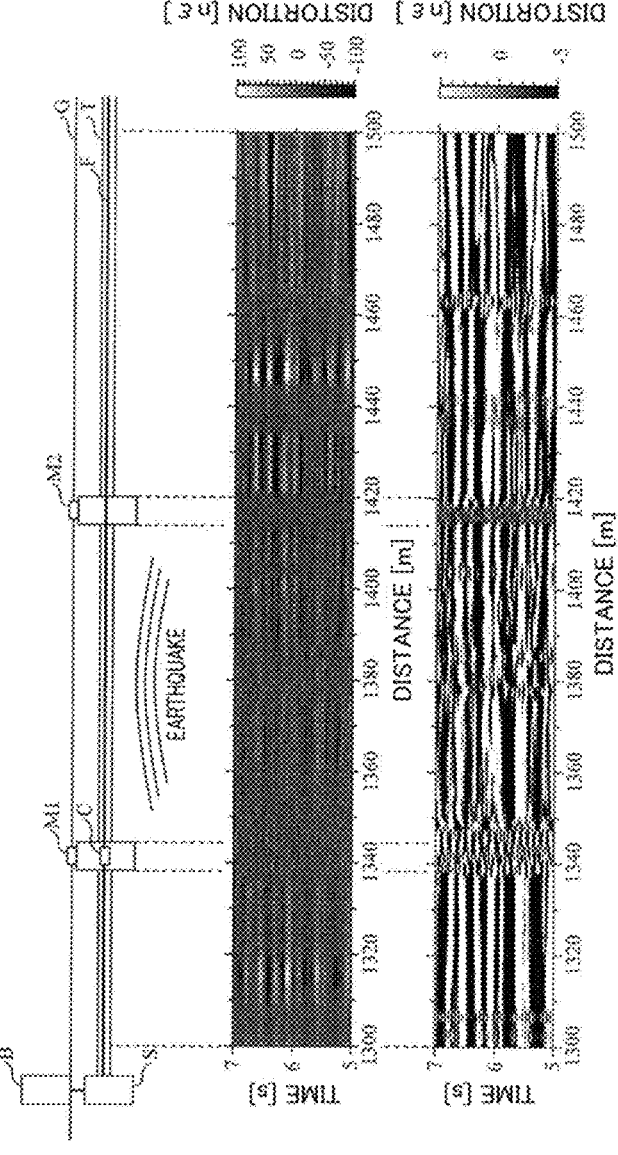
FIG. 6 is a diagram showing a specific example of an optical communication underground facility position contrast processing of a second embodiment.

A specific example of the optical communication underground facility position contrast processing of the second embodiment is shown in FIG. 6. The optical fiber F is, in being laid under the ground G, laid within the conduit T, connected by the closure C under the manhole M1, and passes under the manhole M2 without using the closure C.

In the middle stage of FIG. 6, the change over time in the distortion amplitude distribution in the longitudinal direction of the optical fiber F is shown within the range of 100 nε to −100 nε with the color scale of the distortion amplitude being set to the full scale. In the lower stage of FIG. 6, the change over time in the distortion amplitude distribution in the longitudinal direction of the optical fiber F is shown within the range of 5 nε to −5 nε with the color scale of the distortion amplitude being set to the enlarged scale.

In the periphery of the vicinity of the longitudinal distances 1320 m, 1380 m and 1460 m or the like of the optical fiber F, the change over time in the distortion amplitude distribution in the longitudinal direction of the optical fiber F is continuous on the longitudinal distance of the optical fiber F (step S13, YES). This is because the optical fiber F is in contact with the ground G through the conduit T. In the periphery of the vicinity of the longitudinal distance 1440 m of the optical fiber F, the change over time in the distortion amplitude distribution in the longitudinal direction of the optical fiber F is continuous on the longitudinal distance of the optical fiber F (step S13, YES), but has a smaller distortion amplitude. This is because the optical fiber F does not come into close contact with the conduit T and is weak in contact with the ground G.

Then, the underground facility position contrast unit 23 estimates that the underground facility state of the optical fiber F is the section of the conduit T in the periphery of the vicinity of the longitudinal distances 1320 m, 1380 m, and 1460 m or the like of the optical fiber F (step S15), and can associate the position of the conduit T with the periphery of the vicinity of the longitudinal distances 1320 m, 1380 m, and 1460 m or the like of the optical fiber F (step S16). Then, the underground facility position contrast unit 23 estimates that the underground facility state of the optical fiber F is the section of the conduit T with which the optical fiber F does not come into close contact in the periphery of the vicinity of the longitudinal distance 1440 m of the optical fiber F (step S15), and can associate the position of the conduit T with which the optical fiber F does not come into close contact with the periphery of the vicinity of the longitudinal distance 1440 m of the optical fiber F (step S16).

Only in the vicinity of the longitudinal distance 1340 m of the optical fiber F, the change over time in the distortion amplitude distribution in the longitudinal direction of the optical fiber F is discontinuous on the longitudinal distance of the optical fiber F, and has a high-frequency distortion amplitude (step S13, NO). This is because the optical fiber F is not in contact with the ground G and connected by closure C within the manhole M1. Only in the vicinity of the longitudinal distance 1420 m of the optical fiber F, the change over time in the distortion amplitude distribution in the longitudinal direction of the optical fiber F is discontinuous on the longitudinal distance of the optical fiber F, and hardly has distortion amplitude (step S13, NO). This is because the optical fiber F is not in contact with the ground G and only passes without using the closure C within the manhole M2.

Then, the underground facility position contrast unit 23 estimates that the underground facility state of the optical fiber F is the section of the manhole M1 in which the closure C exists only in the vicinity of the longitudinal distance 1340 m of the optical fiber F (step S14), and can associate the position of the manhole M1 in which the closure C exists with the vicinity of the longitudinal distance 1340 m of the optical fiber F (step S16). The underground facility position contrast unit 23 estimates that the underground facility state of the optical fiber F is the section of the manhole M2 through which the optical fiber F passes only in the vicinity of the longitudinal distance 1420 m of the optical fiber F (step S14), and can associate the position of the manhole M2 through which the optical fiber F passes with the vicinity of the longitudinal distance 1420 m of the optical fiber F (step S16).

In this way, the positions of the sections of the manholes M1, M2 and the section of the conduit T or the like can be associated with the longitudinal distance of the optical fiber F based on whether the change over time in the distortion amplitude distribution in the longitudinal direction of the optical fiber F is continuous or discontinuous on the longitudinal distance of the optical fiber F.

INDUSTRIAL APPLICABILITY

The optical communication underground facility position contrast system, the method for optical communication underground facility position contrast, and the optical communication underground facility position contrast device of the present disclosure can reduce the human operation rate by using the earthquake vibration in associating the underground facility position of the optical fiber with the longitudinal distance of the optical fiber.

REFERENCE SIGNS LIST

S: Underground facility position contrast system
F: Optical fiber
B: Optical communication aggregation building
G: Ground
M, M1, M2: Manhole
C: Closure
T: Conduit
1: Scattered light intensity distribution measurement device
2: Underground facility position contrast device
21: Scattered light intensity distribution acquisition unit
22: Distortion response distribution measurement unit
23: Underground facility position contrast unit

The invention claimed is:

1. An optical communication underground facility position contrast system, comprising:
   a scattered light intensity distribution measurement device for measuring, when an earthquake vibration is applied to an optical fiber laid underground, a change over time in a scattered light intensity distribution in a longitudinal direction of the optical fiber; and
   an underground facility position contrast device for measuring a change over time in a distortion response distribution in the longitudinal direction of the optical fiber based on the change over time in the scattered light intensity distribution in the longitudinal direction of the optical fiber, estimating an underground facility state of the optical fiber based on the change over time in the distortion response distribution in the longitudinal direction of the optical fiber, and associating the underground facility position of the optical fiber with a longitudinal distance of the optical fiber.

2. The optical communication underground facility position contrast system according to claim 1, wherein
   the underground facility position contrast device measures a change over time in a vibration frequency distribution in the longitudinal direction of the optical fiber based on the change over time in the scattered light intensity distribution in the longitudinal direction of the optical fiber, estimates an underground facility state of the optical fiber based on whether the change over time in the vibration frequency distribution in the longitudinal direction of the optical fiber is continuous or discontinuous on a longitudinal distance of the optical fiber, and associates the underground facility position of the optical fiber with the longitudinal distance of the optical fiber.

3. The optical communication underground facility position contrast system according to claim 1, wherein
   the underground facility position contrast device measures a change over time in a vibration frequency distribution in the longitudinal direction of the optical fiber based on the change over time in the scattered light intensity distribution in the longitudinal direction of the optical fiber, estimates an underground facility state of the optical fiber based on whether the change over time in the vibration frequency distribution in the longitudinal direction of the optical fiber coincides with or differs from the change over time in the vibration frequency of the earthquake vibration, and associates the underground facility position of the optical fiber with the longitudinal distance of the optical fiber.

4. The optical communication underground facility position contrast system according to claim 1, wherein the underground facility position contrast device measures a change over time in a distortion amplitude distribution in the longitudinal direction of the optical fiber based on the change over time in the scattered light intensity distribution in the longitudinal direction of the optical fiber, estimates an underground facility state of the optical fiber based on whether the change over time in the distortion amplitude distribution in the longitudinal direction of the optical fiber is continuous or discontinuous on a longitudinal distance of the optical fiber, and associates the underground facility position of the optical fiber with the longitudinal distance of the optical fiber.

5. A method for optical communication underground facility position contrast, comprising the sequential steps of:
   acquiring, when an earthquake vibration is applied to an optical fiber laid underground, information of a change over time in a scattered light intensity distribution in a longitudinal direction of the optical fiber;
   measuring a change over time in a distortion response distribution in the longitudinal direction of the optical fiber based on the change over time in the scattered light intensity distribution in the longitudinal direction of the optical fiber; and
   estimating an underground facility state of the optical fiber based on the change over time in the distortion response distribution in a longitudinal direction of the optical fiber, and
   associating the underground facility position of the optical fiber with a longitudinal distance of the optical fiber.

6. An optical communication underground facility position contrast device, comprising:
   a scattered light intensity distribution acquisition unit for acquiring, when an earthquake vibration is applied to an optical fiber laid underground, information of a change over time in a scattered light intensity distribution in a longitudinal direction of the optical fiber;
   a distortion response distribution measurement unit for measuring a change over time in a distortion response distribution in the longitudinal direction of the optical fiber based on the change over time in the scattered light intensity distribution in the longitudinal direction of the optical fiber; and
   an underground facility position contrast unit for estimating an underground facility state of the optical fiber based on the change over time in the distortion response distribution in the longitudinal direction of the optical fiber, and associating the underground facility position of the optical fiber with a longitudinal distance of the optical fiber.

* * * * *